(No Model.)
L. S. FLATAU.
SEED PLANTER.
No. 334,223.   Patented Jan. 12, 1886.
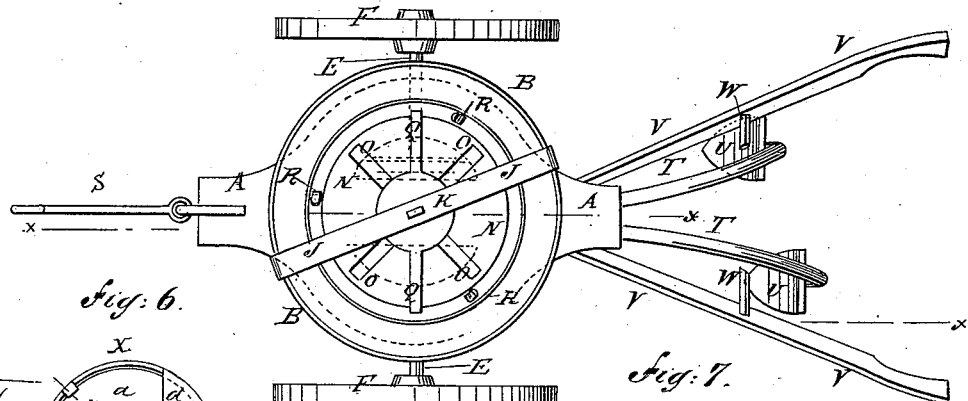
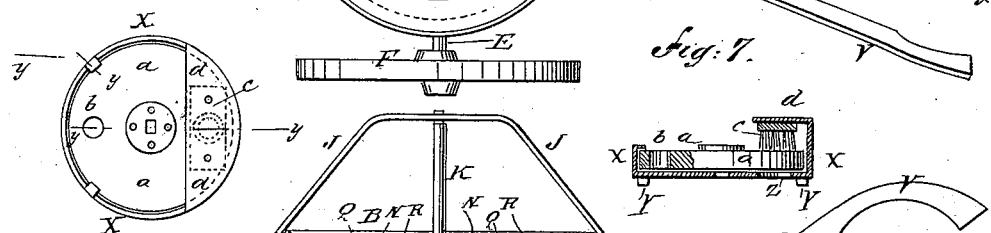
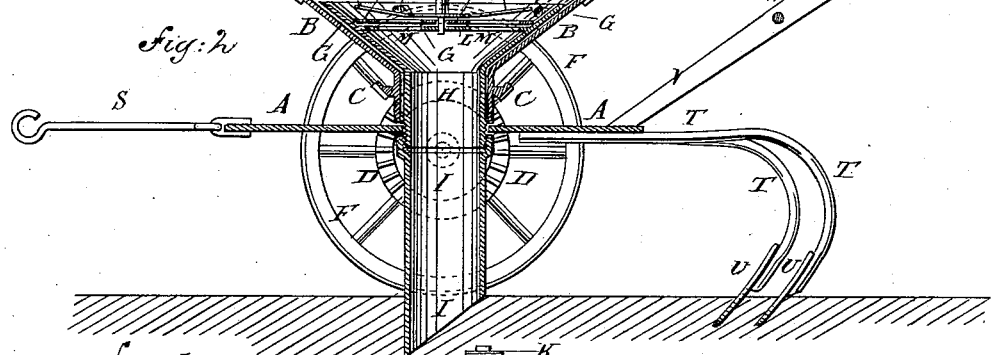
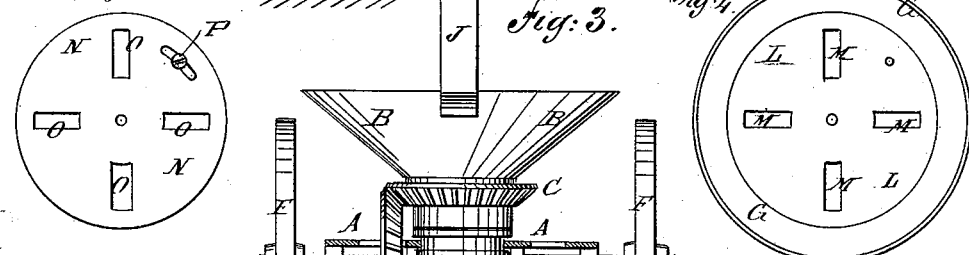
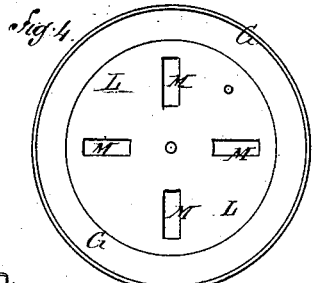
WITNESSES:
Chas. Nida
C. Sedgwick
INVENTOR:
L. S. Flatau
BY Munn & Co.
ATTORNEYS.

UNITED STATES PATENT OFFICE.

LOUIS S. FLATAU, OF PITTSBURG, TEXAS.

SEED-PLANTER.

SPECIFICATION forming part of Letters Patent No. 334,223, dated January 12, 1886.

Application filed October 8, 1885. Serial No. 179,337. (No model.)

*To all whom it may concern:*

Be it known that I, LOUIS S. FLATAU, of Pittsburg, in the county of Camp and State of Texas, have invented certain new and useful Improvements in Seed-Planters, of which the following is a full, clear, and exact description.

Reference is to be had to the accompanying drawings, forming part of this specification, in which similar letters of reference indicate corresponding parts in all the figures.

Figure 1 is a plan view of one of my improved seed-planters, part being broken away. Fig. 2 is a sectional side elevation of the same, taken through the line $x\ x\ x$, Fig. 1. Fig. 3 is a sectional rear elevation of the same. Fig. 4 is a plan view of the stationary bottom pan of the hopper. Fig. 5 is a plan view of the gage-plate of the stationary bottom pan. Fig. 6 is a plan view of the corn-dropping wheel and its appliances. Fig. 7 is a sectional elevation of the same, taken through the broken line $y\ y\ y\ y$, Fig. 6.

The object of this invention is to improve the construction of the cotton-planters for which Letters Patent No. 307,283 were granted to me October 28, 1884, in such a manner as to make them more reliable and effective in operation.

The invention consists in the construction and combination of various parts of the seed-planter, as will be hereinafter fully described, and then claimed.

A represents the frame of the planter, which may be made of cast-iron, wrought-iron, or other suitable material.

B represents a flaring or funnel-shaped hopper, the lower part of which is made tubular, and at its lower end rests and revolves upon the frame A, around a hole formed through the center of the said frame. To the tubular lower part of the hopper B is attached a beveled gear-wheel, C, into the teeth of which mesh the teeth of the beveled gear-wheel D, attached to the inner part of one of the axles E. The axles E revolve in bearings attached to the frame A, and to their outer ends are attached the wheels F. With this construction the funnel-shaped hopper B will be revolved by the advance of the machine.

Within the lower part of the hopper B is fitted a correspondingly-shaped pan, G, having a tube, H, attached to its lower end. The tube H passes through the central aperture in the frame A, and has a screw-thread formed on its lower end, upon which is screwed the upper end of the tubular plow I, so that the said tubular plow will serve as a continuation of the tube H, to conduct the seed to the bottom of the furrow opened by the said plow. The tubular shank of the plow I also serves as a nut to fasten the flaring pan G securely in place and hold it stationary while the hopper B revolves around it.

To the opposite sides of the upper part of the hopper B are rigidly attached the ends of an arched bar or bail, J, in the center of which is formed a square hole to receive the squared upper end of a short vertical shaft, K, so that the said shaft will be turned by the revolution of the said hopper B. The lower end of the shaft K has a round tenon formed upon it to enter and revolve in a hole in the center of the bottom L, rigidly secured in and to the lower part of the flaring pan G, and forming the bottom of the said pan. In the bottom L are formed a number of radial slots, M, through which the seed passes into the tube H and falls through the tubular plow I to the ground. The size of the discharge-openings M, and consequently the amount of seed planted, is regulated by a gage-plate, N, placed upon the bottom L, and provided with radial slots O, equal in number and size to the slots M of the bottom L, and correspondingly arranged, so that by adjusting the gage-plate N the slots M may be left fully open or may be closed to any desired extent. The gage-plate N has a central hole to receive the tenon of the shaft K, and can be secured in any position into which it may be adjusted by a hand-screw, P, which passes through a curved slot in the said gage-plate N and screws into a screw-hole in the stationary bottom plate, L. The lower end of the shaft K, just above its round tenon, is squared to fit in a square hole in the center of the stirrer-wheel Q, so that the said stirrer-wheel will be carried around by and with the said shaft in its revolution. The stirrer-wheel Q is made with radial arms or spokes, which, as the said wheel revolves, push the cotton-seed into and through the discharge-slots in the plates N L, and thus secure a continuous and uniform discharge of seed.

To the inner surface of the upper part of the flaring bottom pan, G, are attached the lugs R, which incline inward and rearward, so as to check the clumps of seed as they are being carried around by the revolving hopper B, and detain them so that they will be torn apart by the radial arms Q and forced out through the discharge-slots in the gage-plate N and bottom plate, L.

To the forward end of the frame A is hinged the rear end of a short draw rod or chain, S, which at its forward end is provided with a hook to receive the single-tree, to which the draft is to be applied, so that the planter can be held steady while being drawn forward, and can adapt itself to the surface of the ground.

To the rear end of the frame A are attached two plow-beams, T, one of which is made a little longer than the other, so that one of the plows U, attached to the downwardly-curved rear ends of the said beams, will be a little in advance of the other, as shown in Figs. 1 and 2. To the rear end of the frame A are also attached the forward ends of the handles V, by means of which the planter is guided, and which are connected and held in proper relative positions by a round, W, attached to their middle parts.

With this construction, as the planter is drawn forward the hopper B and the stirrer-wheel Q will be revolved, which movement causes the said stirrer-wheel Q to force the seed out through the discharge-slots in the gage-plate N and bottom plate, L, into the tube H, through which and the tubular plow I the seed falls into the bottom of the furrow opened by the said plow, and where it is covered by the falling in of the soil and by the soil thrown by the covering-plows U.

When the machine is to be used for planting corn and other smooth seed, the stirrer-wheel Q is detached and a case, X, is placed upon the plates N L, where it is kept from turning by lugs Y, formed upon or attached to its bottom, and which enter the slots in the said plates N L. The case X is made in the form of a short hollow cylinder, and has an opening, Z, in its bottom, near one side, and which is so placed as to be over one of the slots O M of the plates N L, so that the seed discharged through the said opening will fall through the tube H and the tubular plow I to the ground. Within the case X is placed the seed-dropping wheel a, which has a square hole in its center to receive the square lower part of the shaft K, so that the said wheel will be carried around by and with the said shaft in its revolution. The round tenon of the shaft K passes through a hole in the center of the bottom of the case X, and enters the holes in the centers of the plates N L. In the wheel a is formed an opening, b, to receive seed and carry it to the opening Z of the case X, through which it falls to the ground.

c is a cut-off brush, to prevent the wheel a from carrying out any more seed than is contained in the opening b. The brush c is secured to a bar or plate, d, the ends of which are bent downward, and are attached to the sides of the case X.

Having thus described my invention, what I claim as new, and desire to secure by Letters Patent, is—

1. In a seed-planter, the combination, with the rotary funnel-shaped hopper B, the rotary shaft K, connected with the said hopper, and the stationary funnel-shaped bottom pan, G, having lugs R, of the stationary radially-slotted bottom plate, L, and the adjustable radially-slotted gage-plate N, connected with the said bottom pan, and the spoke-wheel Q, attached to the said shaft, substantially as herein shown and described, whereby the seed will be discharged with certainty and in uniform quantities, as set forth.

2. The combination, with the frame A, the shaft E, and the gear D, of the tube H, extending through the frame, the funnel-shaped hopper B, having a neck fitting around the tube H, and a gear, C, meshing with the gear D, the tubular plow I, screwed upon the lower end of the tube H, and mechanism within the hopper for acting on the seed, substantially as set forth.

3. The combination, with the frame A, the rotary funnel-shaped hopper B, the gear C thereon, the axle E, and the gear D, of the inner fixed funnel-shaped pan, G, around which the hopper B revolves, the apertured bottom plate, L, in the hopper-shaped pan G, the shaft K, connected to the hopper B and revolving therewith, and a seed-operating device carried by the lower end of the said shaft over the seed-plate L, substantially as set forth.

4. In a seed-planter, the combination, with the axle having a gear-wheel, of a revoluble hopper on the frame having a gear-wheel meshing into that on the axle, and a seed-operating mechanism within the hopper and operated thereby, substantially as set forth.

LOUIS S. FLATAU.

Witnesses:
G. C. HOPKINS,
F. H. GOODJOHN.